A. JONES.
HOSE RACK.
APPLICATION FILED MAR. 31, 1908.
927,410.
Patented July 6, 1909.
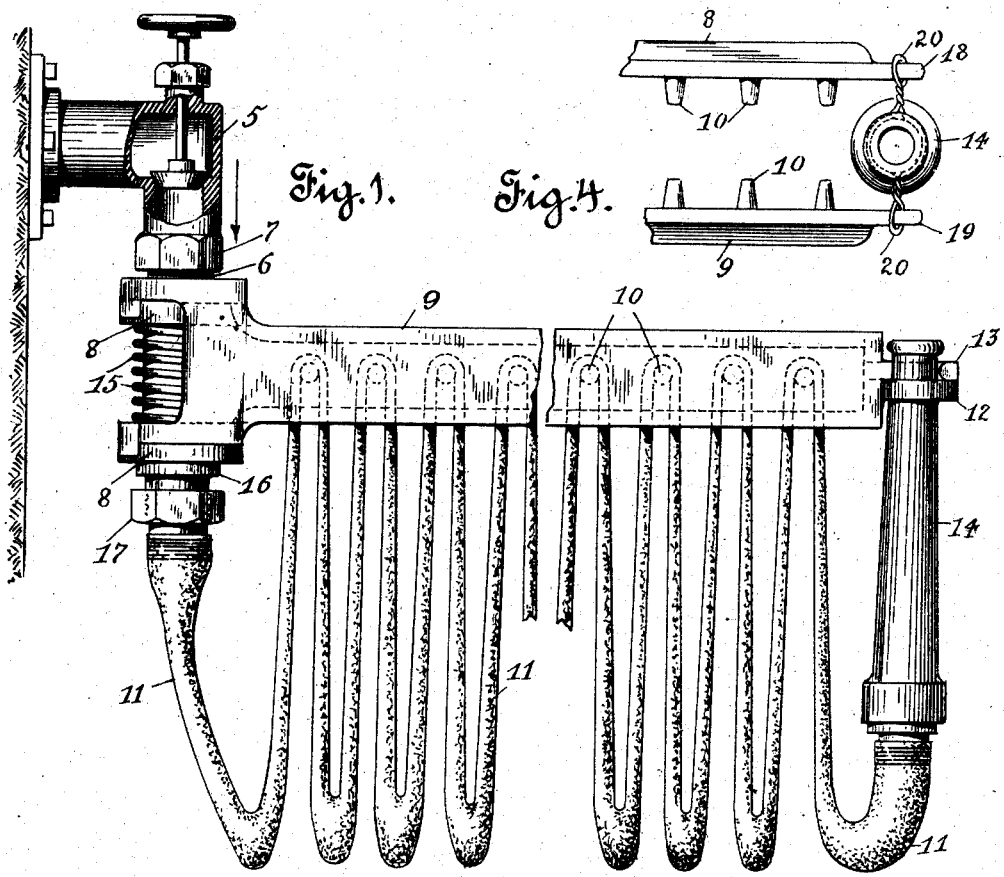
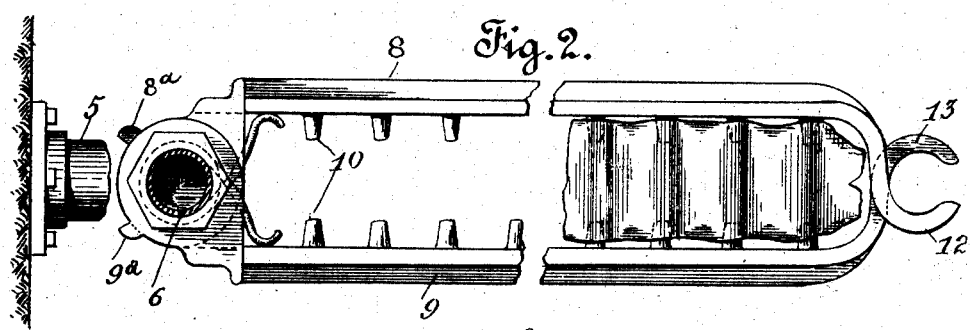
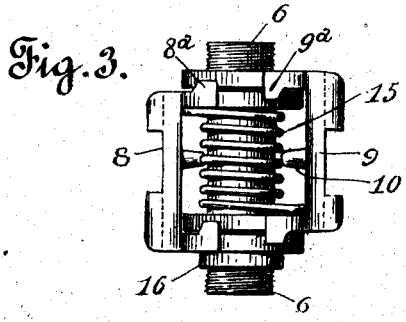
Witnesses.
Inventor,
Arthur Jones,

# UNITED STATES PATENT OFFICE.

ARTHUR JONES, OF LOS ANGELES, CALIFORNIA.

HOSE-RACK.

No. 927,410.   Specification of Letters Patent.   Patented July 6, 1909.

Application filed March 31, 1908. Serial No. 424,338.

*To all whom it may concern:*

Be it known that I, ARTHUR JONES, a citizen of the United States, residing at Los Angeles, county of Los Angeles, State of California, have invented new and useful Improvements in Hose-Racks, of which the following is a specification.

My invention relates primarily to hose racks in buildings for supporting fire hose when not in use, and the object thereof is to provide a hose rack of simple construction and cheaply made, having a large supporting capacity for hose, and from which the hose will drop when the rack is unlocked.

A further object is to so construct a hose rack that the nozzle of the hose forms a portion of the locking means when the arms of the rack are held in position to support a hose.

In the drawings accompanying this application, Figure 1 is a side elevation of my improved hose rack and its support, and a fire hose in place therein. Fig. 2 is a plan of the parts shown in Fig. 1 with the rear portion of the hose and the nozzle removed for clearness of illustration. Fig. 3 is a rear end elevation of the rack. Fig. 4 is a detail of the front end of a modified form of rack.

In the drawings 5 is a valve which is secured to the water supply pipe in a building. To this valve is secured a nipple 6 by nut 7. Upon this nipple are mounted the swinging arms 8 and 9 of my improved rack. The opposing faces of these arms are oppositely disposed and parallel, and spaced apart the width of the hose they are to support. They are provided with knobs 10 which are arranged in pairs as best shown in Fig. 2, upon which the hose 11 is looped as shown in dotted lines in Fig. 1. These knobs extend a sufficient distance into the loops of hose at each side to retain the hose supported thereby when the arms are locked as shown in Fig. 1. The outer ends of these arms preferably cross each other and then are curved forming hooks 12 and 13, which hooks provide means to support the nozzle 14 of the hose as shown in Fig. 1, and when the nozzle is placed in these hooks it locks the arms from separating. The central portion of the rear portion of the arms is cut away as best shown in Figs. 1 and 3, so that the rear portion of the arms consist of separated rings which surround the nipple, the rings of one arm lying upon the rings of the other arm. Arm 8 is provided with a lug 8ª, and arm 9 is provided with a lug 9ª. These lugs when the arms are separated at their free ends as hereinafter explained, strike each other, thereby jarring the arms so that the hose will fall off the knobs 10, if it has not done so before.

Between the rings and the arms and mounted on the nipple is a coiled spring 15, the free ends of which preferably bear against the inner sides of the arms as best shown in Figs. 2 and 3, to cause the free ends of the arms to separate when the nozzle of the hose is withdrawn from the hooks on the front end. A bearing collar 16 is screwed upon the lower part of the nipple to hold the arms mounted thereon. The hose nut 17 attaches the hose to the lower end of the nipple. The nipple could be cast with a shoulder on the lower end to hold the arms thereon, and it could be cast integral with the valve if desired. When the hose is desired for use, a pull upon the nozzle releases it from the arms. Spring 15 then throws the free ends of the arms apart until the lugs strike each other when the further movement of the arms cease. The jar caused by the striking of the lugs causes the hose to drop off the knobs on the arms, if it has not already done so. It can then be drawn by the firemen to any part of the building to which it would reach. The valve would be opened by the firemen to supply the necessary water to the hose. After use the hose is properly drained and when ready to put back into the rack the outer ends of the arms are brought together as shown in Fig. 2 when the nozzle would be inserted in the hooks which would lock the arms together. The hose would then be looped upon the knobs of the arms and the rack could then be swung around against the side of the wall.

In Fig. 4 I have shown the arms terminating in pins 18 and 19 instead of hooks as shown in Figs. 1 and 2. When such construction is used the outer end of the nozzle would be provided with a locking loop 20, which would preferably be a loop of wire secured upon the end of the nozzle by twisting the same at each side thereof to form eyes that would slip over the pins 18 and 19, thereby preventing the movement of the free ends of the arms away from each other. I prefer, however, the construction shown in Figs. 1 and 2 as thereby no additional part is required to be fastened to the nozzle.

Having described my invention what I claim is,

1. In a hose rack two pivoted arms having oppositely disposed parallel faces; knobs on said opposing faces arranged in pairs; means to cause the free ends of said arms to separate when unlocked; and means to lock the opposed faces of said arms in a parallel position, said locking means being secured upon the nozzle of the hose.

2. A hose rack comprising a pair of arms pivotally secured together at the rear end thereof and having their front ends crossing each other and then projecting in hooks forwardly, said arms being adapted to be held by the nozzle of the hose with their opposing surfaces parallel; knobs arranged in oppositely disposed pairs secured upon the oppositely disposed and parallel faces of said arms; and means for causing the free ends of said arms to separate when unlocked.

3. In a hose rack carrying a hose two pivoted arms having oppositely disposed parallel faces; knobs on said opposing faces arranged in pairs; normally separated lugs upon the rear ends of said arms; a spring having the ends thereof bearing against said arms to cause the free ends thereof to separate; and locking means for securing said arms with their opposed faces parallel.

In witness that I claim the foregoing I have hereunto subscribed my name this 20th day of March, 1908.

ARTHUR JONES.

Witnesses:
G. E. HARPHAM,
S. B. AUSTIN.